US011190906B2

(12) United States Patent
Isson et al.

(10) Patent No.: US 11,190,906 B2
(45) Date of Patent: Nov. 30, 2021

(54) METHOD OF NOTIFICATION OF INFORMATION DETERMINED BY A TERMINAL DESTINED FOR AN ACCESS NETWORK OF A WIRELESS COMMUNICATION SYSTEM

(71) Applicant: SIGFOX, Labege (FR)

(72) Inventors: Olivier Isson, Saint-Orens de Gameville (FR); Renaud Marty, Ramonville Saint Agne (FR)

(73) Assignee: SIGFOX, Labege (FR)

( * ) Notice: Subject to any disclaimer, the term of this patent is extended or adjusted under 35 U.S.C. 154(b) by 0 days.

(21) Appl. No.: 16/652,495

(22) PCT Filed: Oct. 12, 2018

(86) PCT No.: PCT/EP2018/077854
§ 371 (c)(1),
(2) Date: Mar. 31, 2020

(87) PCT Pub. No.: WO2019/073026
PCT Pub. Date: Apr. 18, 2019

(65) Prior Publication Data
US 2020/0275237 A1 Aug. 27, 2020

(30) Foreign Application Priority Data
Oct. 12, 2017 (FR) ...................... 17 59580

(51) Int. Cl.
*H04W 4/02* (2018.01)
*H04W 4/38* (2018.01)
(Continued)

(52) U.S. Cl.
CPC ............ *H04W 4/027* (2013.01); *H04L 67/12* (2013.01); *H04W 4/38* (2018.02); *H04W 4/70* (2018.02);
(Continued)

(58) Field of Classification Search
CPC ........ Y02D 30/70; H04W 4/02; H04W 4/023; H04W 4/027; H04W 4/029; H04W 52/0254
See application file for complete search history.

(56) References Cited

U.S. PATENT DOCUMENTS

| 9,179,304 B2 * | 11/2015 | Zelinka | H04W 4/02 |
| 2013/0090090 A1 * | 4/2013 | Rivere | G08G 1/202 |
| | | | 455/411 |

(Continued)

OTHER PUBLICATIONS

Higuchi et al., "Mobile Node Localization Focusing on Stop-and-Go Behavior of Indoor Pedestrians," IEEE Transactions on Mobile Computing, Jul. 2014, pp. 1564-1578, vol. 13, No. 7, IEEE Service Center.

*Primary Examiner* — Nam T Huynh
(74) *Attorney, Agent, or Firm* — Im IP Law; Chai Im; C. Andrew Im

(57) ABSTRACT

A method of notifying of the information determined by a terminal to an access network of a wireless communication system by the terminal. Evaluation of a predetermined criterion for motion detection as a function of measurements provided by a motion sensor. Time stamping of the motion detected, when the motion detection criterion is satisfied, by storing an instant of detection of the detected motion. Determination of respective start times and end times of mobility phases of the terminal, as a function of the instants of detection. Determination of information by the terminal as a function of the respective start times and end times of the mobility phases of the terminal. Formation of a notification message including the information determined. Transmission of the notification message.

16 Claims, 2 Drawing Sheets

(51) Int. Cl.
    *H04W 4/70* (2018.01)
    *H04L 29/08* (2006.01)
    *H04W 68/00* (2009.01)
    *G16Y 40/10* (2020.01)
    *G16Y 10/75* (2020.01)

(52) U.S. Cl.
    CPC ........... *H04W 68/005* (2013.01); *G16Y 10/75* (2020.01); *G16Y 40/10* (2020.01)

(56) References Cited

U.S. PATENT DOCUMENTS

| | | | |
|---|---|---|---|
| 2016/0066155 A1* | 3/2016 | Fan | H04W 4/027 455/457 |
| 2016/0105764 A1 | 4/2016 | Evans et al. | |
| 2017/0169041 A1* | 6/2017 | Vijayvergiya | H04W 4/029 |
| 2017/0373526 A1* | 12/2017 | Huang | H02J 7/0021 |

\* cited by examiner

US 11,190,906 B2

METHOD OF NOTIFICATION OF INFORMATION DETERMINED BY A TERMINAL DESTINED FOR AN ACCESS NETWORK OF A WIRELESS COMMUNICATION SYSTEM

RELATED APPLICATIONS

This application is a § 371 application of PCT/EP2018/077854 filed Oct. 12, 2018, which claims priority from French Patent Application No. 17 59580 filed Oct. 12, 2017, each of which is incorporated herein by reference in its entirety.

TECHNICAL FIELD

The present invention belongs to the field of wireless communication systems, and more particularly relates to a method for notifying, by a terminal, information determined by said terminal, to an access network of a wireless communication system.

The present invention is particularly advantageous for applications of the M2M (Machine-to-Machine) type, or of the IoT (Internet of Things) type, although is not limited thereto.

STATE OF THE ART

In the context of the IoT for example, all everyday objects are destined to become able to communicate, and are thus equipped with a terminal adapted to emit data to an access network of a wireless communication system.

In such a context, it is important that solutions are both inexpensive (thus not very complex) and at the same time consume little energy. This allows a large number of everyday objects to be given the ability to communicate, for example, without significantly affecting the production cost thereof, and above all without having a too great impact on the autonomy thereof when battery-powered.

For mobile objects, in particular, the ability to recurrently receive, at the access network, information provided by these objects is desired. This information can be information that is determined from measurements carried out by sensors of the terminal with which an object is equipped.

However, the addition of such sensors, in addition to the transmission of the measurements provided by these sensors, increase the power consumption of the object, especially in cases of too frequent transmissions, which can become problematic, especially for battery-powered objects. Moreover, the terminals with which such objects are equipped generally have a limited bandwidth, which can be insufficient if too many measurements must be transmitted.

OBJECT OF THE INVENTION

The purpose of the present invention is to overcome all or part of the limitations of the solutions of the prior art, in particular those described hereinabove, by proposing a solution that limits the power consumption associated with the use of certain sensors of the terminal and with the transmission of the information determined by said terminal.

Moreover, the present invention further aims to propose a solution that limits, at least in some embodiments, the quantity of data required to transmit the information determined by said terminal.

For this purpose, and according to a first aspect, the invention relates to a method for notifying, by a terminal, information determined by said terminal, to an access network of a wireless communication system. Since said terminal comprises a motion sensor adapted to provide measurements representative of the movement of said terminal, said method comprises:

assessing, as a function of the measurements provided by the motion sensor, a predetermined movement detection criterion and, when the movement detection criterion is satisfied: time stamping the movement detected by storing a detection time at which the movement was detected, determining, as a function of the detection times, respective start times and end times of mobility phases of the terminal, determining information by the terminal as a function of the respective start times and end times of mobility phases of said terminal, forming a notification message comprising the determined information, transmitting, by the terminal, the notification message to the access network.

Thus, the motion sensor of the terminal is mainly implemented to identify the mobility phases of the terminal. The term "mobility phase" is understood herein to mean a time interval during which the terminal is considered to be moving. Two successive mobility phases are separated by an immobility phase, which corresponds to a time interval during which the terminal is considered to be unmoving. In order to identify such mobility phases, the motion sensor does not need to be used in a continuous manner, such that the use thereof can be optimised in order to reduce the power consumption of the terminal. For example, the motion sensor can be placed, by default, in standby mode, and can be woken up periodically, the period whereof being selected to as to obtain the desired accuracy when determining the start times and end times of the mobility phases.

The information to be transmitted is then determined as a function of the start times and end times of mobility phases, i.e. taking into account the mobility phases (and thus also the immobility phases) of said terminal.

In particular, if the information is determined as a function of the measurements carried out by a sensor of the terminal, the sensor can thus be controlled so as to carry out the measurements while taking into account the mobility phases of the terminal. For example, if the measurement corresponds to a GPS (Global Positioning System) measurement carried out by a position detector, and if no mobility phase has been detected since the last GPS measurement was carried out, there is no need to carry out a new GPS measurement, since, in principle, the terminal has not moved since the last GPS measurement. If, however, a mobility phase end time is detected, a new GPS measurement may be relevant in order to measure the position of said terminal at the end of the last mobility phase. The power consumption of the position detector can thus be reduced, while guaranteeing the relevance of the GPS measurements carried out.

According to specific embodiments, the notification method can further comprise one or more of the following features, which must be considered singly or according to any combinations technically possible.

According to specific embodiments, determining start times and end times of mobility phases comprises identifying detection times belonging to the same mobility phase and detection times belonging to different mobility phases in order to identify, from among the detection times, those which correspond to start times of mobility phases and those which correspond to end times of mobility phases.

According to specific embodiments, the information included in the notification message corresponds to the respective start times and end times of mobility phases of the terminal.

Thus, the information to be transmitted is, in such a case, movement information for the terminal. The notification message can comprise the respective start times and end times of a plurality of mobility phases, and the determination of said movement information mainly involves identifying the start times and the end times that must be included in the notification message which will be transmitted to the access network. In other words, a notification message does not need to be transmitted every time a mobility phase is detected. A wireless communication module of the terminal can thus be placed in standby mode for extended periods, while limiting the number of times it is woken up to transmit the notification messages, thus reducing the power consumption of said wireless communication module and of the terminal.

Moreover, the movement information can be reduced to the respective start times and end times of the mobility phases of the terminal, which represents a much lower quantity of data than the quantity of data represented by the measurements provided by the motion sensor and used to determine the mobility phases. Such movement information is thus suitable for wireless communication systems with a low bandwidth.

According to specific embodiments, when the notification message is being formed, the start times and the end times are encoded in the form of time differences relative to a reference time, the reference time not being included in the notification message formed by the terminal.

Such provisions further reduce the quantity of data required to transmit the movement information for the terminal, since this data corresponds to "relative" start times and end times, defined relative to the reference time which is not included in the notification message. As a result, the access network must be able to determine the reference time in order to retrieve the "absolute" start times and end times of the mobility phases of the terminal from the movement information included in the notification message received.

According to specific embodiments, the reference time is the time at which the notification message is transmitted.

Such provisions are advantageous in that the access network can determine the reference time in a simple manner. More specifically, the time of receipt, by the access network, of the notification message transmitted by the terminal can be used as a reference time for retrieving the "absolute" start times and end times of the mobility phases.

According to specific embodiments, the determination of information by the terminal comprises, when an end time and/or a start time of a mobility phase is detected, a measurement by another sensor of said terminal, which is separate from the motion sensor. The information determined and included in the notification message is representative of the measurement carried out by said other sensor. For example, said other sensor is a sensor suitable for measuring at least one of the following physical magnitudes:
the position of the terminal,
the temperature,
the atmospheric pressure,
the brightness,
the magnetic field, etc.

Thus, the information included in the notification message corresponds to a measurement carried out by another sensor of said terminal. However, the measurement is preferably carried out only when a mobility phase end time (and/or start time) has been detected. On the one hand, this reduces the power consumption of this other sensor, which can be placed, by default, in standby mode, and woken up only when a measurement must be carried out. On the other hand, the information represents a much lower quantity of data than the quantity of data represented by measurements carried out in a periodic manner or each time the detection criterion is satisfied. Such information is nonetheless of great use since it is representative of the environment reached by the terminal at the end of each mobility phase.

According to specific embodiments, the determination of respective start times and end times of mobility phases comprises:
storing, in a record table, the detection time for each movement detected, said record table comprising a predetermined number $n_{mem}$ of respective detection times of previously detected movements,
when the movement detection criterion is satisfied such that a new movement is detected: assessing a predetermined detection criterion for a new mobility phase by comparing the detection time of the new movement detected with the detection times stored in the record table,
when the detection criterion for a new mobility phase is satisfied: storing the detection time of the new movement detected as a start time of the new mobility phase and the most recent detection time stored in the record table as an end time of the previous mobility phase.

According to specific embodiments, the detection criterion for a new mobility phase is satisfied when the following expression is satisfied:

$$td - \Sigma_{i=1}^{n_{mem}} a_i \cdot td_i > V0$$

in which expression:
td corresponds to the detection time of the new movement detected,
$td_i$ corresponds to the detection time of rank i ($1 \leq i \leq n_{mem}$) stored in the record table,
$a_i$ corresponds to a weighting coefficient of the detection time of rank i ($1 \leq i \leq n_{mem}$),
V0 corresponds to a predetermined threshold value.

According to specific embodiments, where the measurements provided by the motion sensor are representative of accelerations $a_x$, $a_y$ and $a_z$ of the terminal along three axes, the movement detection criterion is satisfied when the following expression is satisfied:

$$N\{a_x, a_y, a_z\} > V1$$

in which expression:
$N\{a_x, a_y, a_z\}$ corresponds to a norm of an acceleration vector formed by the accelerations $a_x$, $a_y$ and $a_z$,
V1 corresponds to a predetermined threshold value.

According to specific embodiments, where the measurements provided by the motion sensor are representative of accelerations $a_x$, $a_y$ and $a_z$ of the terminal along three axes, the movement detection criterion is satisfied when the following expression is satisfied:

$$N\{|\Delta a_x|, |\Delta a_y|, |\Delta a_z|\} > V2$$

in which expression:
$|\Delta a_x|$, $|\Delta a_y|$ and $|\Delta a_z|$ correspond to the respective variations of the accelerations $a_x$, $a_y$ and $a_z$,
$N\{|\Delta a_x|, |\Delta a_y|, |\Delta a_z|\}$ corresponds to a norm of an acceleration variation vector formed by the acceleration variations $|\Delta a_x|$, $|\Delta a_y|$ and $|\Delta a_z|$,
V2 corresponds to a predetermined threshold value.

According to a second aspect, the invention relates to a computer program product comprising a set of program code instructions which, when executed by a processor, configure said processor to implement a notification method according to any of the embodiments of the invention.

According to a third aspect, the invention relates to a terminal comprising a motion sensor, a wireless communication module adapted to exchange data with an access network of a wireless communication system, and a processing circuit configured so as to implement the steps of a notification method according to any of the embodiments of the invention.

According to a fourth aspect, the invention relates to a wireless communication system comprising an access network and a plurality of terminals according to any of the embodiments of the invention.

BRIEF DESCRIPTION OF THE FIGURES

The invention will be better understood after reading the following description, intended for purposes of illustration only and not intended to limit the scope of the invention, given with reference to the figures which represent.

In these figures, identical reference numerals in one or another figure denote identical or similar elements. For clarity purposes, the elements shown are not to scale, unless specified otherwise.

DETAILED DESCRIPTION OF THE EMBODIMENTS

Figure 1:
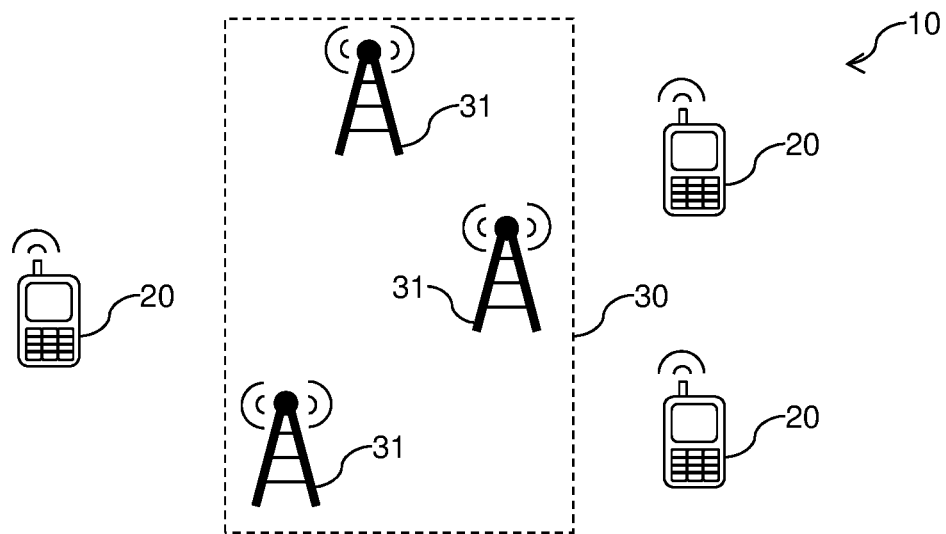
FIG. 1: a diagrammatic view of one example embodiment of a wireless communication system.

FIG. 1 diagrammatically shows a wireless communication system 10 comprising terminals 20 and an access network 30 comprising, for example, a plurality of base stations 31.

The terminals 20 and the base stations 31 exchange data in the form of radio-frequency signals. The term "radio-frequency signal" must be understood herein to mean an electromagnetic wave propagating in free space, the frequencies whereof lie in the conventional spectrum of radio-frequency waves (several hertz to several hundred gigahertz).

The data exchanges between a terminal 20 and the base stations 31 are, for example, bi-directional. In other words, the terminal 20 is capable of transmitting data over an uplink to base stations 31, and of receiving data over a downlink from said base stations 31 to said terminal 20.

However, this does not rule out, according to other examples, having uni-directional exchanges by uplink only. Numerous IoT-type applications consist of collecting data transmitted by terminals 20, and are perfectly suited to exchanges by uplink only between each terminal 20 and the base stations 31.

According to one non-limiting example, the wireless communication system 10 is an ultra-narrowband communication system. The term "ultra-narrowband" or UNB is understood herein to mean that the instantaneous frequency spectrum of the signals transmitted by the terminals 20 has a frequency bandwidth of less than two kilohertz, or even of less than one kilohertz. Such provisions are particularly advantageous in that the transmission of such signals can take place with a very low power consumption, particularly suited for IoT-type applications.

Figure 2:
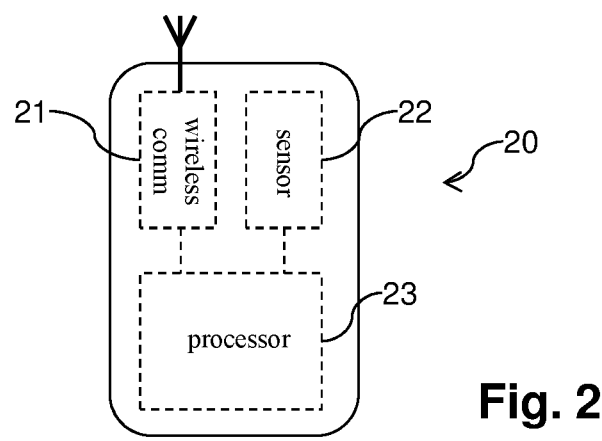
FIG. 2: a diagrammatic view of one example embodiment of a terminal with which a communicating object can be equipped.

FIG. 2 diagrammatically illustrates one example embodiment of a terminal 20.

As shown in FIG. 2, the terminal 20 comprises a wireless communication module 21 adapted to exchange data with the base stations 31 of the access network 30. The wireless communication module 21 is present, for example, in the form of an electric circuit comprising equipment (antenna, amplifier, local oscillator, mixer, analogue filter, etc.) known to a person skilled in the art.

The terminal 20 further comprises a motion sensor 22 adapted to provide measurements representative of the movement of said terminal 20. For example, the motion sensor 22 is an accelerometer adapted to provide measurements of the acceleration $a_x$, $a_y$ and $a_z$ of the terminal 20 along three preferably orthogonal axes. However, this does not rule out, according to other examples, considering other types of motion sensors (gyroscope, inclination sensor, compass, etc.) and/or a motion sensor adapted to measure the movement of the terminal 20 along a number of axes other than three.

Moreover, the terminal 20 further comprises a processing circuit 23, connected to the wireless communication module 21 and to the motion sensor 22. The processing circuit 23 comprises, for example, one or more processors and storage means (magnetic hard drive, electronic memory, optical disc, etc.) in which a computer program product is stored, in the form of a set of program code instructions to be executed in order to implement the steps of a notification method 50 described hereinbelow. Alternatively or additionally, the processing circuit 23 comprises one or more programmable logic devices (FPGA, PLD, etc.), and/or one or more application-specific integrated circuits (ASIC, etc.), and/or a set of discrete electronic components, etc., suitable for implementing all or part of said steps of the notification method 50.

In other words, the processing circuit 23 comprises a set of means designed through the software (specific computer program product) and/or hardware (FPGA, PLD, ASIC, discrete electronic components, etc.) thereof to implement, in conjunction with the wireless communication module 21 and the motion sensor 22, the steps of the notification method 50 described hereinbelow.

Figure 3:
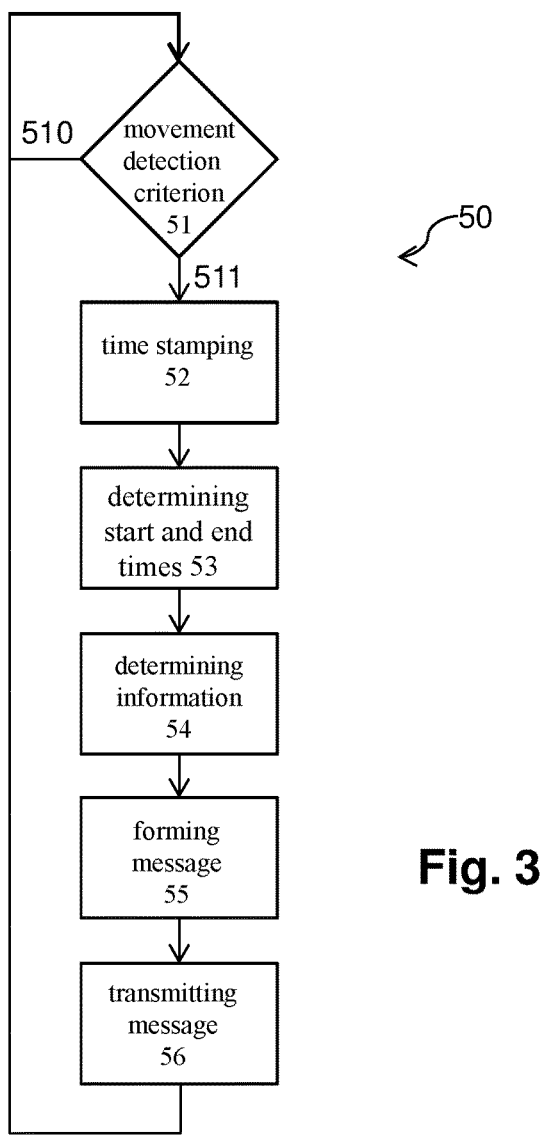
FIG. 3: an operating diagram showing the main steps of a method for notifying information determined by the terminal to an access network.

FIG. 3 shows the main steps, implemented by the terminal 20, of a method 50 for notifying information determined by the terminal 20 to the access network 30, which are:
  51 assessing, as a function of the measurements provided by the motion sensor 22, a predetermined movement detection criterion and, when the movement detection criterion is satisfied: 52 time stamping the movement detected by storing a detection time at which the movement was detected,
  53 determining, as a function of the detection times, respective start times and end times of mobility phases of the terminal 20,
  54 determining information by the terminal 20 as a function of the respective start times and end times of mobility phases of said terminal,
  55 forming a notification message comprising the determined information,
  56 transmitting the notification message to the access network 30.

It should be noted that the order of the different steps shown in FIG. 3 is given for illustrative purposes only in order to provide a clear figure, and cannot be considered to limit the scope of the invention.

The description below is provided with reference to the non-limiting case whereby the information to be transmitted, determined by the terminal 20, is information concerning the movement of said terminal 20.

Step 51 of assessing the movement detection criterion is, for example, carried out by the processing circuit 23, as a function of the measurements provided by the motion sensor 22.

Alternatively, and preferably, the step 51 of assessing the movement detection criterion is carried out by the motion sensor 22. The assessment of the movement detection criterion can thus be carried out without intervention by the processing circuit 23. As a result, the processing circuit 23 can be placed in standby mode, and can be woken up by an interruption generated by the motion sensor 22 when the movement detection criterion is satisfied. Such provisions are thus particularly advantageous as regards the power consumption of the terminal 20.

The description below is provided with reference to the non-limiting case whereby step 51 of assessing the movement detection criterion is carried out by the motion sensor 22, and whereby the processing circuit 23 is, by default, in standby mode.

Step 51 of assessing the movement detection criterion is, for example, carried out in a recurring manner. For example, the motion sensor 22 measures the movement of the terminal 20 periodically with a period $T_m$ (for example in the range of several tens of milliseconds to several hundreds of milliseconds), and assesses, as a function of this measurement, the movement detection criterion. In such a case, the motion sensor 22 can be placed in standby mode by default, the motion sensor 22 thus being configured so as to wake up every $T_m$ seconds to measure the movement and assess the movement detection criterion. Such provisions are advantageous in that they further reduce the power consumption of the terminal 20.

In general, any type of movement detection criterion can be assessed, provided that it allows it to be determined whether the terminal 20 is moving or if, conversely, it is unmoving. The choice of a specific movement detection criterion merely constitutes an alternative embodiment of the invention.

Examples of possible movement detection criteria are provided hereinbelow, with reference to the non-limiting case whereby the motion sensor 22 is an accelerometer which provides measurements representative of accelerations $a_x$, $a_y$ and $a_z$ of the terminal 20 along three axes. It should be noted that a plurality of the detection criteria hereinbelow can be considered, which must, for example, all be considered satisfied in order to pronounce the detection of a movement of the terminal 20.

In general, the movement detection criterion can be considered to be satisfied when the following expression is satisfied:

$$N\{a_x, a_y, a_z\} > V1$$

in which expression V1 corresponds to a predetermined positive threshold value.

According to a first example, the norm considered is the infinity norm, and the movement detection criterion can be considered to be satisfied when the following expression is satisfied:

$$\max\{|a_x|, |a_y|, |a_z|\} > V1$$

For example, the threshold value V1 in such a case lies in the range 1·g to 1.5·g (g being the gravitational acceleration on the Earth's surface, approximately equal to 9.81 m/s²), for example equal to 1.3·g.

Alternatively or additionally, the norm considered is the one-norm, and the movement detection criterion can be considered to be satisfied when the following expression is satisfied:

$$|a_x| + |a_y| + |a_z| > V1$$

For example, the threshold value V1 in such a case lies in the range 0.8·g to 1.2·g, for example equal to 0.95·g.

Alternatively or additionally, the norm considered is the two-norm, and the movement detection criterion can be considered to be satisfied when the following expression is satisfied:

$$\sqrt{a_x^2 + a_y^2 + a_z^2} > V1$$

Alternatively or additionally, the movement detection criterion can be considered to be satisfied when the following expression is satisfied:

$$N\{|\Delta a_x|, |\Delta a_y|, |\Delta a_z|\} > V2$$

in which expression:
- $|\Delta a_x|$, $|\Delta a_y|$ and $|\Delta a_z|$ correspond to the respective variations of the accelerations $a_x$, $a_y$ and $a_z$ over a predetermined period, for example a period that lies in the range from several tens of milliseconds to several hundreds of milliseconds,
- V2 corresponds to a predetermined positive threshold value.

Similarly to that described hereinabove, the norm considered can be the infinity norm, the one-norm or the two-norm, etc. In the case where the norm considered is the infinity norm, the threshold value V2 lies, for example, in the range 0.1·g to 0.4·g, for example equal to 0.27·g.

When the movement detection criterion is not satisfied (reference 510 in FIG. 3), i.e. when it is considered that, according to the measurements, the terminal 20 is not moving, the motion sensor 22 returns, for example, to standby mode for $T_m$ seconds.

When the movement detection criterion is satisfied (reference 511 in FIG. 3), i.e. when it is considered that, according to the measurements, the terminal 20 is moving, the motion sensor 22 generates, for example, an interruption intended to wake up the processing circuit 23 if the latter is in standby mode. The processing circuit 23 then time stamps (step 52 of the notification method 50) the movement detected by storing the detection time for said detected movement.

As shown in FIG. 3, the notification method 50 further comprises a step 53 of determining, from among the stored detection times, said detection times that correspond to start times and to end times of mobility phases of the terminal 20. The determination step 53 is, for example, carried out by the processing circuit 23 every time the movement detection criterion is satisfied.

As stated hereinabove, the term "mobility phase" is understood herein to mean a time interval during which the terminal is considered to be moving. Two successive mobility phases are separated by an immobility phase, which corresponds to a time interval during which the terminal is considered to be unmoving.

More specifically, the movement detection criterion allows it to be determined whether the terminal 20 is moving at a given time, or conversely whether it is unmoving. The stored detection times of the movements detected a priori belong to mobility phases of the terminal 20, however it is not known at this stage whether two successive detection times belong to the same mobility phase or to different mobility phases (in which case they are separated by an immobility phase). As a result, the purpose of the determination step 53 is to identify the detection times that belong to the same mobility phase and the detection times which, conversely, belong to different mobility phases so as to ultimately determine the respective start times and end times of the mobility phases. Moreover, this allows the quantity of data stored to be reduced since, for each mobility phase, only two detection times are stored (corresponding to the start time and to the end time), whereas a mobility phase can comprise numerous detection times if the duration thereof is greater than the period $T_m$. In other words, after having identified the detection times which correspond to a start time and to an end time of the same mobility phase, the detection times between said start time and said end time no longer need to be stored in memory.

In general, any method for determining the respective start times and end times of the mobility phases as a function of the detection times can be implemented. The choice of a specific method merely constitutes an alternative embodiment of the invention.

Figure 4:
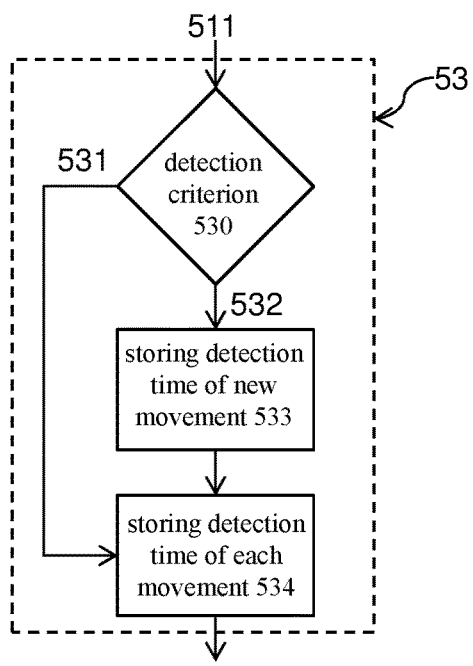
FIG. 4: an operating diagram showing one preferred embodiment of determining respective start times and end times of mobility phases of the terminal.

FIG. 4 diagrammatically shows one preferred embodiment of the determination step 53. It should be noted that the order of the different steps shown in FIG. 4 is given for illustrative purposes only in order to provide a clear figure, and does not limit the scope of the invention.

As shown in FIG. 4, the notification method 50 comprises a step 534 of storing, in a record table, the detection time for each movement detected. The record table comprises a predetermined number $n_{mem}$ of detection times, which correspond to the last movements previously detected. The record table is present, for example, in the form of a vector T:

$$T=[td_1, td_2, \ldots, td_{n_{mem}}]$$

in which expression $td_i$ corresponds to the detection time of rank i ($1 \leq i \leq n_{mem}$), $td_{n_{mem}}$ being, by convention, the oldest detection time and $td_1$ being the most recent detection time. For example, when commissioning the terminal 20, the record table is initialised with a zero vector, and the detection time for the first detected movement corresponds to a mobility phase start time. The number $n_{mem}$ can depend on the application considered and, for example, lies in the range 2 to 10, for example equal to 4.

As shown in FIG. 4, when the movement detection criterion is satisfied (reference 511 in FIG. 4) such that a new movement is detected and time stamped (detection time td), the determination step 53 comprises a step 530 of assessing a predetermined detection criterion for a new mobility phase by comparing the detection time of the new movement detected with the detection times stored in the record table.

In general, any type of criterion for detecting a new mobility phase can be assessed, provided that it allows it to be determined whether the detection time of the new movement detected corresponds to a new mobility phase, i.e. to a mobility phase that is different from that of the detection times stored in the record table. The choice of a specific new mobility phase detection criterion merely constitutes an alternative embodiment of the invention.

According to preferred embodiments, the detection criterion for a new mobility phase can be considered to be satisfied when the following expression is satisfied:

$$td - \Sigma_{i=1}^{n_{mem}} a_i \cdot td_i > V0$$

in which expression:
  td corresponds to the detection time of the new movement detected,
  $a_i$ corresponds to a weighting coefficient of the detection time of rank i ($1 \leq i \leq n_{mem}$),
  V0 corresponds to a predetermined positive threshold value.

The coefficients $a_i$ ($1 \leq i \leq n_{mem}$) can take on any suitable form. For example, the coefficients $a_i$ can gradually increase from the coefficient $a_1$ to reach a maximum value and gradually decrease to the coefficient $a_{n_{mem}}$. Coefficients $a_i$ that are all equal to one another can also be considered, for example by taking the following expression:

$$td - \frac{\sum_{i=1}^{n_{mem}} td_i}{n_{mem}} > V0$$

More generally, any type of temporal filtering for the detection times $td_i$ ($1 \leq i \leq n_{mem}$) can be considered. The temporal filtering can be linear (such as in the previous expressions) or non-linear (for example to output a median value of said detection times $td_i$, which is compared to the detection time td).

The value V0 depends on the application considered and can be chosen such that short immobility phases, for example of a duration of less than fifteen minutes, are ignored. In other words, the value V0 can be chosen such that two mobility phases separated by a short immobility phase are detected as being the same mobility phase of the terminal 20. Moreover, the choice of the value V0 can also take into account a priori knowledge of a typical duration of a mobility phase, the value V0 being, where appropriate, chosen to be less than said typical duration. For example, the value V0 lies in the range 30 minutes to 120 minutes, for example equal to 45 minutes.

When the new mobility phase detection criterion is not satisfied (reference 531 in FIG. 4), i.e. when the detection time for the new movement detected is considered to belong to the same mobility phase as the detection times stored in the record table, the detection time td is stored (step 534) in the record table as the most recent detection time, and the oldest detection time $td_{n_{mem}}$ is deleted from said record table.

When the new mobility phase detection criterion is satisfied (reference 532 in FIG. 4), i.e. when the detection time for the new movement detected is considered to belong to a different mobility phase from that of the detection times stored in the record table, the notification method 50 comprises a step 533 of storing the detection time td of the new movement detected as a start time of the new mobility phase and the most recent detection time $td_1$ stored in the record table as the end time of the previous mobility phase. The detection time td is then stored (step 534) in the record table. Preferably, the detection time td thus replaces all of the detection times stored in the record table such that it becomes:

$$T=[td, td, \ldots, td]$$

As shown in FIG. 3, the notification method 50 further comprises a step 54 of determining movement information as a function of the respective start times and end times of the detected mobility phases of the terminal 20. The description hereinbelow is provided with reference to the non-limiting case whereby the movement information considered is representative of the respective start times and end times of the detected mobility phases of said terminal 20.

In practice, knowledge of the mobility phases of a terminal 20 (and thus also of the immobility phases thereof), and of the object to which said terminal 20 is connected, can be used in numerous applications. For example, if objects are intended to move together, then, by comparing the mobility phases of these objects, it can be detected whether one of these objects is no longer moving with the others, which thus corresponds to an anomaly.

According to another very real example, in the case of objects corresponding to lorries, start times and end times of the mobility phases can be used to determine the durations of breaks taken by these lorries in order, for example, to ensure that these break durations comply with the regulatory durations for breaks.

As shown in FIG. 3, the notification method 50 further comprises a step 55 of forming a notification message comprising the movement information for the terminal 20.

Step 55 of forming the notification message, which is for example carried out by the processing circuit 23, is carried out, for example, in a recurring manner. For example, the formation step 55 is carried out when a predetermined number of mobility phases has been detected since the formation of the previous notification message. According to another example, the formation step 55 is carried out periodically, with a period Tf that is greater than the period Tm, or even significantly greater than Tm. The period Tf is, for example, in the order of several hours, for example equal to 6 hours.

When the step 55 of forming the notification message is carried out, it can be determined whether, at the time tf at which said formation message is formed, a previous mobility phase in progress can be considered to have ended. This involves, for example, carrying out step 53 of determining start times and end times of the mobility phases of the terminal 20 by replacing, in the previous expressions, the detection time td with the formation time tf.

As stated hereinabove, the respective start times and end times of the mobility phases in principle represent a lower quantity of data than that represented by all of the detection times of the movements detected.

According to preferred embodiments further reducing the quantity of data to be included in the notification message, the start times and the end times are encoded in the form of time differences relative to a reference time, and the reference time is not included in the notification message. In other words, the movement information included in the notification message corresponds to start times and end times that are "relative" to a reference time, which is not transmitted.

For example, in the case of forming and transmitting a notification message every 6 hours, and considering the time differences to be defined with a step of 100 seconds, and that the reference time lies within a time interval delimited by the transmission time of the previous notification message and the intended transmission time of the notification message currently being formed, all possible values of the time differences (between 0 and 6 hours) can be encoded into an 8-bit sequence. More specifically, the maximum value thus capable of being encoded is equal to 255·100 seconds, which corresponds to approximately 7 hours. It is thus understood that the movement information can be encoded with a very low quantity of data.

The reference time is not transmitted, and the access network 30 must thus be able to determine it, in order to allow said access network 30 to recalculate, where necessary, "absolute" start times and end times. Preferably, the reference time is the intended transmission time of the notification message currently being formed. More specifically, the time of receipt, by the access network 30, of the notification message transmitted by the terminal 20 can be used as a reference time for retrieving the "absolute" start times and end times of the mobility phases.

The notification method 50 thus comprises a step 56 of transmitting, by the wireless communication module 21, the notification message to the access network 30. Advantageously, when the terminal 20 does not transmit any notification message, the wireless communication module 21 can be placed in standby mode in order to reduce power consumption. Once the notification message has been formed or transmitted, the record table is, for example, reset to a zero vector.

Generally speaking, it should be noted that the embodiments considered above have been described by way of non-limiting examples, and that other alternative embodiments can thus be envisaged.

In particular, the invention has been described while considering, in a non-limiting manner, that the movement information for the terminal 20 corresponds to the respective start times and end times of the mobility phases of said terminal. This does not rule out, according to other examples, alternatively or additionally considering other types of movement information to be included in the notification message. According to one non-limiting example, the step 54 of determining movement information for the terminal 20 can comprise, when an end time (and/or a start time) of a mobility phase is detected, measuring the position of said terminal, the movement information determined being representative of the measured position of said terminal. For this purpose, the terminal 20 comprises a position detector (not shown in the figures), which can be of any suitable type. For example, the position detector is a GPS sensor (Global Positioning System), in which case the position measurements correspond to the GPS coordinates of said terminal, or even a Wi-Fi communication module, in which case the position measurements correspond to an identifier of a Wi-Fi base station, the position whereof is known or capable of being determined by the access network 30, located in the vicinity of said terminal, etc.

Moreover, the invention has been described while considering that the information to be transmitted, determined by the terminal 20, corresponds to movement information for said terminal 20. However, this does not rule out, according to other examples, alternatively or additionally considering other types of information to be included in the notification message. According to one example, the step 54 of determining information for the terminal 20 can comprise, when an end time (and/or a start time) of a mobility phase is detected, measuring the temperature, the information determined being representative of the temperature measured by said terminal. According to another example, the step 54 of determining information for the terminal 20 can comprise, when an end time (and/or a start time) of a mobility phase is detected, measuring the atmospheric pressure, the information determined being representative of the atmospheric pressure measured by said terminal. According to another example, the step 54 of determining information for the terminal 20 can comprise, when an end time (and/or a start time) of a mobility phase is detected, measuring the brightness, the information determined being representative of the brightness measured by said terminal. According to another example, the step 54 of determining information for the terminal 20 can comprise, when an end time (and/or a start time) of a mobility phase is detected, measuring the magnetic field, the information determined being representative of the magnetic field measured.

The invention claimed is:

1. A method for notifying information determined by a terminal, to an access network of a wireless communication system by the terminal, wherein the terminal comprises a processing circuit connected to a motion sensor configured to provide measurements representative of a movement of the terminal, the method comprising:
   assessing, by the motion sensor, a predetermined movement detection criterion;
   time stamping, by the processing circuit, a movement of the terminal detected by storing a detection time of the movement of the terminal in response to a determination that the predetermined movement detection criterion has been satisfied;
   determining, by the processing circuit, as a function of detection times, respective start times and end times of mobility phases of the terminal;
   determining information by the terminal as a function of the respective start times and end times of mobility phases of the terminal;
   forming a notification message comprising the information determined by the terminal;
   transmitting the notification message to the access network;
   wherein the determination of respective start times and end times of the mobility phases comprises:
   storing, in a record table, the detection time for each detected movement of the terminal, the record table comprising a predetermined number $n_{mem}$ of respective detection times of previously detected movements of the terminal;
   in response to a determination that the predetermined movement detection criterion has been satisfied such that a new movement is detected, assessing a predetermined detection criterion for a new mobility phase by comparing a detection time of the new movement detected with the detection times stored in the record table; and
   in response to determination that the predetermined detection criterion for the new mobility phase has been satisfied, storing the detection time of the new movement detected as a start time of the new mobility phase and a most recent detection time stored in the record table as an end time of a previous mobility phase.

2. The method according to claim 1, wherein the determination of the respective start times and end times of the mobility phases comprises identifying detection times that belong to a same mobility phase and detection times that belong to different mobility phases.

3. The method according to claim 1, wherein the motion sensor by default is in a standby mode and is configured to wake up recurrently to provide the measurements of the movement of the terminal and to assess the predetermined movement detection criterion as a function of the measurements.

4. The method according to claim 1, wherein the information determined corresponds to the respective start times and end times of the mobility phases of the terminal.

5. The method according to claim 4, wherein the notification message comprises the respective start times and end times encoded in a form of time differences relative to a reference time, the reference time is not included in the notification message.

6. The method according to claim 5, wherein the reference time is a transmission time of the notification message.

7. The method according to claim 1, wherein the processing circuit is woken up from a standby mode by an interruption generated by the motion sensor when the movement detection criterion is satisfied.

8. The method according to claim 1, wherein the motion sensor is an accelerometer.

9. The method according to claim 1, wherein the information determined by the terminal comprises a measurement by another sensor of the terminal in response to a detection of at least one of an end time and a start of a mobility phase, the other sensor being different from the motion sensor, the information determined being representative of the measurement performed by the other sensor of the terminal.

10. The method according to claim 9, wherein the other sensor is a position detector.

11. The method according to claim 1, wherein the predetermined detection criterion for the new mobility phase is satisfied when a following expression is satisfied:

$$td - \Sigma_{i=1}^{n_{mem}} a_i \cdot td_i > V0$$

wherein:
td corresponds to the detection time of the new movement detected,
$td_i$ corresponds to a detection time of rank i stored in the record table,
$a_i$ corresponds to a weighting coefficient of the detection time of rank i, and
V0 corresponds to a predetermined threshold value.

12. The method according to claim 1, wherein the measurements provided by the motion sensor are representative of accelerations $a_x$, $a_y$ and $a_z$, of the terminal along three axes, the predetermined movement detection criterion is satisfied when a following expression is satisfied:

$$N\{a_x, a_y, a_z\} > V1$$

wherein:
$N\{a_x, a_y, a_z\}$ corresponds to a norm of an acceleration vector formed by the accelerations $a_x$, $a_y$ and $a_z$, and
V1 corresponds to a predetermined threshold value.

13. The method according to claim 1, wherein the measurements provided by the motion sensor are representative of accelerations $a_x$, $a_y$ and $a_z$, of the terminal along three axes, the predetermined movement detection criterion is satisfied when a following expression is satisfied:

$$N\{|\Delta a_x|, |\Delta a_y|, |\Delta a_z|\} > V2$$

wherein:
$|\Delta a_x|$, $|\Delta a_y|$ and $|\Delta a_z|$ correspond to the respective variations of the accelerations $a_x$, $a_y$ and $a_z$,
$N\{|\Delta a_x|, |\Delta a_y|, |\Delta a_z|\}$ corresponds to a norm of an acceleration variation vector formed by the acceleration variations $|\Delta a_x|$, $|\Delta a_y|$ and $|\Delta a_z|$,
V2 corresponds to a predetermined threshold value.

14. A computer program product recorded on a non-transitory media executable by a processor, comprising a set of program code instructions to implement the method according to claim 1.

15. A terminal comprising a motion sensor, a wireless communication device configured to exchange data with the access network of the wireless communication system and a processing circuit configured to implement the method according to claim 1.

16. A wireless communication system comprising the access network and a plurality of terminals according to claim 15.

* * * * *